United States Patent [19]

Alsenz

[11] Patent Number: 5,392,612
[45] Date of Patent: Feb. 28, 1995

[54] REFRIGERATION SYSTEM HAVING A SELF ADJUSTING CONTROL RANGE

[75] Inventor: Richard H. Alsenz, 2402 Creek Meadows, Missouri City, Tex. 77459

[73] Assignee: Richard H. Alsenz, Missouri City, Tex.

[21] Appl. No.: 72,525

[22] Filed: Jun. 4, 1993

Related U.S. Application Data

[63] Continuation-in-part of Ser. No. 1,107, Jan. 6, 1993, which is a continuation of Ser. No. 736,688, Jul. 7, 1991, abandoned, which is a continuation of Ser. No. 880,677, Jun. 30, 1986, Pat. No. 5,035,119, which is a continuation-in-part of Ser. No. 639,271, Aug. 8, 1984, Pat. No. 4,651,535.

[51] Int. Cl.⁶ ............................................. F25B 41/04
[52] U.S. Cl. ..................................... 62/115; 62/225; 62/223
[58] Field of Search ................. 62/210, 211, 212, 222, 62/223, 224, 225, 204, 205, 206, 115, 119

[56] References Cited

U.S. PATENT DOCUMENTS

| | | |
|---|---|---|
| 2,331,264 | 10/1943 | Carter . |
| 2,355,894 | 8/1944 | Ray . |
| 2,461,760 | 2/1949 | Newton . |
| 2,828,937 | 4/1957 | Kreitchman . |
| 3,168,242 | 2/1965 | Diener . |
| 3,325,139 | 6/1967 | Diener et al. . |
| 3,455,536 | 7/1969 | Barker . |
| 3,482,816 | 12/1969 | Arnold . |
| 3,523,182 | 8/1970 | Phillips . |
| 3,537,272 | 11/1970 | Hales et al. . |
| 3,577,743 | 5/1971 | Long . |
| 3,638,857 | 2/1972 | Hogel et al. . |
| 3,667,722 | 6/1972 | Katz et al. . |
| 3,698,204 | 10/1972 | Schlotterbeck . |
| 3,751,940 | 8/1973 | Norbeck . |
| 3,814,957 | 6/1974 | Way . |
| 3,914,952 | 10/1975 | Barbier . |
| 3,967,781 | 7/1976 | Kunz . |
| 4,007,425 | 2/1977 | Salisbury . |
| 4,084,388 | 4/1978 | Nelson . |
| 4,112,703 | 9/1978 | Kountz . |
| 4,152,902 | 5/1979 | Lush . |
| 4,192,455 | 3/1980 | Rasmussen et al. . |
| 4,325,508 | 4/1982 | Kunz . |
| 4,353,409 | 10/1982 | Saunders et al. . |
| 4,362,027 | 12/1982 | Barbier . |
| 4,384,462 | 5/1983 | Overman et al. . |
| 4,432,492 | 2/1984 | Kunz . |

(List continued on next page.)

FOREIGN PATENT DOCUMENTS

| | | |
|---|---|---|
| 638726 | 3/1962 | Canada . |
| 2153048 | 4/1973 | France . |
| 2222616 | 10/1974 | France . |
| 2375559 | 7/1978 | France . |
| 110882 | 7/1982 | Japan . |
| 81277 | 5/1983 | Japan . |
| 1077169 | 7/1967 | United Kingdom . |
| 1229407 | 4/1971 | United Kingdom . |
| 2019616 | 10/1979 | United Kingdom . |
| 2130747A | 6/1984 | United Kingdom . |
| 2130747 | 6/1984 | United Kingdom . |
| 2130747B | 9/1986 | United Kingdom . |

*Primary Examiner*—Harry B. Tanner

[57] ABSTRACT

A closed loop vapor compression refrigeration system wherein the control range of a control parameter for controlling the flow of the refrigerant through the evaporator coil is automatically adjusted as the operating conditions change is disclosed. A control parameter for controlling the refrigerant flow through the evaporator and a dynamic control range for the control parameter are defined. The control range is made a function of certain system parameters. A nonlinear flow control response function associated with the control parameter is selected. During operation, the control range is automatically adjusted as the values of the selected system parameters change. The flow through a flow control device, such as an expansion valve, coupled to the evaporator, is adjusted according to the flow control response function as the value of the control parameter changes.

13 Claims, 3 Drawing Sheets

U.S. PATENT DOCUMENTS

| | | |
|---|---|---|
| 4,439,997 | 4/1984 | Cantley . |
| 4,448,038 | 5/1984 | Barbier . |
| 4,456,028 | 6/1984 | Watson . |
| 4,459,819 | 7/1984 | Hargraves . |
| 4,463,576 | 8/1984 | Burnett et al. . |
| 4,467,613 | 8/1984 | Behr et al. . |
| 4,481,788 | 11/1984 | Yoshino . |
| 4,487,031 | 12/1984 | Rogers et al. . |
| 4,499,739 | 2/1985 | Matsuoka . |
| 4,501,125 | 2/1985 | Han . |
| 4,506,518 | 3/1985 | Yoshikawa . |
| 4,510,767 | 4/1985 | Komatsu et al. . |
| 4,523,436 | 6/1985 | Schedel et al. . |
| 4,548,047 | 10/1985 | Hayashi et al. . |
| 4,644,756 | 2/1987 | Sugimoto et al. . |
| 4,646,532 | 3/1987 | Nose ................................ 62/225 X |
| 4,653,288 | 3/1987 | Sayo et al. . |
| 4,685,309 | 8/1987 | Behr ................................ 62/223 X |
| 4,698,981 | 10/1987 | Kaneko et al. ................... 62/223 X |
| 5,187,944 | 2/1993 | Jarosch ............................. 62/225 |

REFRIGERATION SYSTEM HAVING A SELF ADJUSTING CONTROL RANGE

CROSS-REFERENCE TO RELATED APPLICATIONS

This application is a continuation-in-part of copending U.S. patent application Ser. No. 08/001,107, filed Jan. 6, 1993, which is a continuation of U.S. patent application Ser. No. 07/736,688, filed Jul. 7, 1991, and abandoned, which is a continuation of U.S. patent application Ser. No. 06/880,677, filed Jun. 30, 1986, which issued as U.S. Pat. No. 5,035,119 on Jul. 30, 1991, which is a continuation-in-part of U.S. patent application Ser. No. 06/639,271, filed Aug. 8, 1984, which issued as U.S. Pat. No. 4,651,535 on Mar. 24, 1987.

BACKGROUND OF THE INVENTION

1. Field of the Invention

This invention relates generally to a closed loop vapor cycle refrigeration system, and more particularly to a refrigeration system wherein the control range of a control parameter is automatically adjusted as the operating conditions change.

2. Description of the Related Art

Refrigeration systems are frequently operated by maintaining a control parameter, such as the superheat, at a set value. However, the ideal or desired superheat setting is different for different fixtures and it also changes (or is dynamic in nature) as the operating conditions or the load on the refrigeration system changes. The design of the fixture (open freezer, closed freezer, upright freezer, etc.) and the load on the refrigeration system determine the desired superheat setting. Furthermore, some refrigeration systems can be operated efficiently at a relatively high superheat setting while others can only be operated efficiently at a relatively low superheat setting.

It is, therefore, desirable to have a refrigeration system in which the set points for the control parameter are automatically changed or adjusted as the operating conditions of the refrigeration system change.

Modern refrigeration systems frequently use electronically controlled expansion valves for controlling flow of the refrigerant to the evaporator coil. Typically, the expansion valve is operated at a single superheat setting and the refrigerant flow rate through the expansion valve is proportional for all values of the superheat. Such proportional control systems are not very responsive to the changes of the operating conditions of the refrigeration system at all operating times, partly because in such systems the percent change in the flow rate at higher superheat values is less than the percent change at lower superheat values. Thus, to effect the same percentage change in the flow of the refrigerant at higher superheat values as at lower superheat values, a greater change in the superheat must occur. Additionally, the prior art refrigeration systems suffer from the problem commonly known as hunting due to the presence of a hysteresis in the expansion valve.

It is, therefore, advantageous to have a refrigeration system which does not exhibit the hunting problem and in which the refrigerant flow rate through the evaporator coil is adjusted so as to cause the refrigeration system to respond more quickly to changes in the operating conditions.

The present invention addresses the above-noted problems and provides a refrigeration system wherein a control region or range for a control parameter is defined as a function of selected parameters of the refrigeration system (selected "system parameters"). The control region is automatically adjusted or changed as the values of the selected system parameters change. The refrigerant flow rate through the evaporator coil is adjusted according to a control response curves defined for the control parameter. An apparatus and method for eliminating the hunting problem associated with the prior art expansion valves and the use of nonlinear flow control response curves for varying the refrigerant flow rate through an expansion valve are disclosed in the parent patent application of this application, Ser. No. 08/001,106, filed Jan. 6, 1993, which application is incorporated herein by reference and is made a part of this application for all purposes.

SUMMARY OF THE INVENTION

The present invention provides a closed loop vapor cycle refrigeration system that includes a condenser for condensing a high pressure, high temperature gas refrigerant into a liquid refrigerant, an evaporator coil for evaporating the liquid refrigerant into a low pressure gas refrigerant, a flow control device for controlling the flow of the refrigerant into the evaporator coil, and a control circuit for controlling the operation of the refrigeration system, including the flow of the refrigerant into the evaporator coil. A dynamic control region, functionally related to selected system parameters, is determined for controlling a control parameter. A flow control response function (curve) is defined for the values of the control parameter which fall within the control region and for values which are outside the control region. The control circuit determines the value of the control parameter, the dynamic control region and adjusts the flow of the refrigerant into the evaporator coil in accordance with the flow control response curve.

An enthalpy or expansion engine-compressor may be disposed between the evaporator coil and the flow control device of the refrigeration system of the present invention. When an expansion engine-compressor is utilized, the liquid refrigerant from the flow control device flows through the expansion engine, wherein it expands and drives the expansion engine. The expansion engine, in turn, drives the compressor, which compresses the gas refrigerant leaving the evaporator. The flow of the refrigerant through the expansion engine is controlled in the manner described above.

The method of the invention comprises the steps of: selecting a control parameter; establishing for the control parameter a dynamic control region parameter that is functionally related to selected system parameters; defining a flow control response curve for the control parameter; determining the value of the control parameter; and adjusting the flow of the refrigerant into the evaporator according to the flow control response curve.

As an example, superheat may be selected as the control parameter. The dynamic control region may be defined as a function of system parameters, such as the difference between the temperature of the air returning to the evaporator and the temperature of the evaporator coil. A nonlinear flow control response curve may be defined for the superheat values above the control region and a nonlinear flow control response curve having a minimum flow rate may be defined for the superheat values below the control region. In such a system, the control circuit determines the value of the superheat, the control region and adjusts the flow rate of the refrigerant into the evaporator which corresponds to the value of the superheat as defined by the appropriate flow control response curve. The flow rate may be unchanged as long as the superheat remains within the control region or it may be changed according to a flow control response curve defined for such region.

Examples of more important features of the invention have been summarized above rather broadly in order that the detailed description thereof that follows may be better understood, and in order that the contribution to the art may be better appreciated. There are, of course, many additional features of the invention that will be described in detail hereinafter and which will form the subject of the claims appended hereto.

DESCRIPTION OF THE PREFERRED EMBODIMENT

Figure 1:
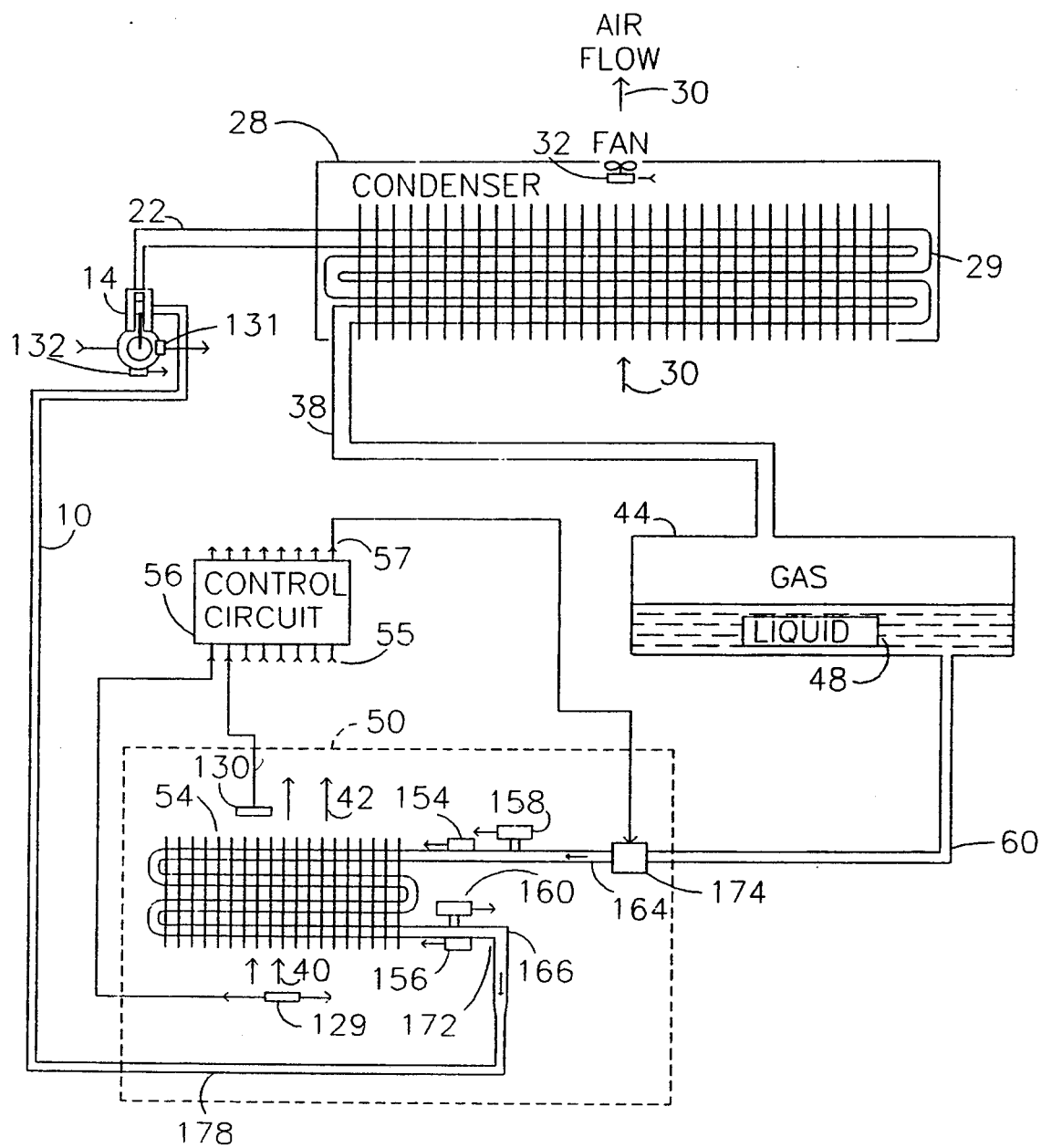
FIG. 1 shows a closed loop vapor cycle refrigeration system.

FIG. 1 shows a closed loop vapor cycle refrigeration system. This refrigeration system includes a primary or system compressor 14 for compressing a low pressure gas refrigerant to a high pressure, high temperature gas refrigerant, a condenser 28 having a fan 32 for blowing air across a coil 29 for condensing the high pressure, high temperature gas refrigerant to a liquid refrigerant, a receiver 44 for storing the liquid refrigerant 48, an evaporator system 50 that includes an evaporator coil 54 for evaporating the liquid refrigerant to a low pressure gas refrigerant, a flow control device or apparatus 174 coupled to an evaporator inlet end 164 for controlling the liquid refrigerant flow into the evaporator coil 54, a number of sensors for providing information about various parameters of the refrigeration system (the "system parameters"), and a micro-controller based control circuit 56 for controlling the operation of the refrigeration system, including that of the flow control device 174, in response to information obtained from the various sensors and in accordance with instructions stored in or provided to the control circuit 56.

The primary compressor 14 receives the low pressure gas refrigerant from the evaporator coil 54 via a suction line 10 and compresses the low pressure gas refrigerant to a high pressure and high temperature gas refrigerant, which passes to the condenser 28 via a line 22. The fan 32 blows air 30 across the condenser coil 29. The fan 32 may be of a fixed speed or variable speed type. The air 30 passing across the condenser 28 removes thermal energy from the refrigerant passing through the condenser, which causes the gas refrigerant to liquefy. The liquid refrigerant from the condenser 28 discharges via a liquid return line 38 into the receiver 44. The liquid refrigerant 48 from the receiver 44 passes via a liquid line 60 to the flow control device 174 of the evaporator system 50.

The flow control device 174 may be: an expansion device, such as a pulse modulated expansion valve; a modulating valve; a stepper motor; a metering device; a liquid-gas separator that supplies the liquid refrigerant to the evaporator coil 54 and the gas to another element of the refrigeration system to perform a useful function; or any other suitable device.

A temperature sensor 129 is placed in the evaporator system 50 for providing to the control circuit 56 electrical signal (information) that is representative of the temperature of the air 40 returning to the evaporator coil 54 (the "return air temperature"). Similarly, a temperature sensor 130 provides information representative of the temperature of the air 42 leaving the evaporator coil 54 (the "discharge air temperature"). Temperature sensors 154 and 156 respectively provide signals to the control circuit 56 representative of the temperature of the refrigerant entering the evaporator coil at the evaporator inlet end 164 and the temperature of the refrigerant leaving the evaporator coil 54 at the outlet end 166. Additionally, pressure sensors 158 and 160 are respectively connected to the evaporator coil inlet end 164 and the outlet end 166 for providing signals to the control circuit 56 which are representative of the pressure of the refrigerant in the evaporator coil at the inlet end and at the outlet.

The liquid refrigerant entering the evaporator coil 54 evaporates to a low pressure gas refrigerant, which discharges at the evaporator coil outlet end 166 and passes on to the compressor 14 via the suction line 10, completing the closed loop vapor refrigeration cycle, which during operation is continuously repeated. Additional temperature sensors 131 and 132 are placed in the system compressor 14 to respectively provide signals to the control circuit 56 which are representative of the temperature of the compressor oil and the temperature of the crankcase of the compressor 14.

The control circuit 56 controls the operation of the refrigeration systems of FIG. 1. The control circuit 56 contains, among other things, a micro-controller or microprocessor, memory for storing information, analog to digital converters, comparators, switching circuitry and other circuits. The use of a micro-controller or microprocessor and related circuitry to control devices or elements described above with respect to FIG. 1 and those elements generally used in refrigeration systems are well known in the electrical engineering art and, therefore, such circuits are not described in detail herein.

The control circuit 56 is operatively coupled (a) via input ports 55 to the temperature sensors 129, 130, 131, 132, 154 and 156, and to the pressure sensors 158 and 160, and (b) via output ports 57 to the compressor 14, fan 32, and flow control device 174. The outgoing arrows at the sensors and the inward arrows 55 at the control circuit 56, indicate that those sensors are operatively coupled to and provide relevant information (signals) to the control circuit 56. The outgoing arrows 57 at the control circuit 56 and inward arrows at system elements, such as the flow control device 174, compressor 14, and fan 32 indicate that the control circuit 56 is operatively coupled to and controls the operation of these elements.

The control circuit 56 receives temperature information from temperature sensors 129, 130, 131, 132, 154, and 156, pressure information from pressure sensors 158 and 160, continually monitors the operation of the various system elements, determines the values of the control parameter and other defined system parameters, such as the return air temperature, the discharge air temperature, the crank case temperature and the compressor oil temperature, determines or computes the control criteria defined for the refrigeration system, and controls the operation of the refrigeration system, including the flow of the refrigerant through the control device 174, in accordance with the instructions programmed in or provided to the control circuit 56. The control logic used to control the refrigerant flow through the evaporator coil is described in detail later.

Figure 2:
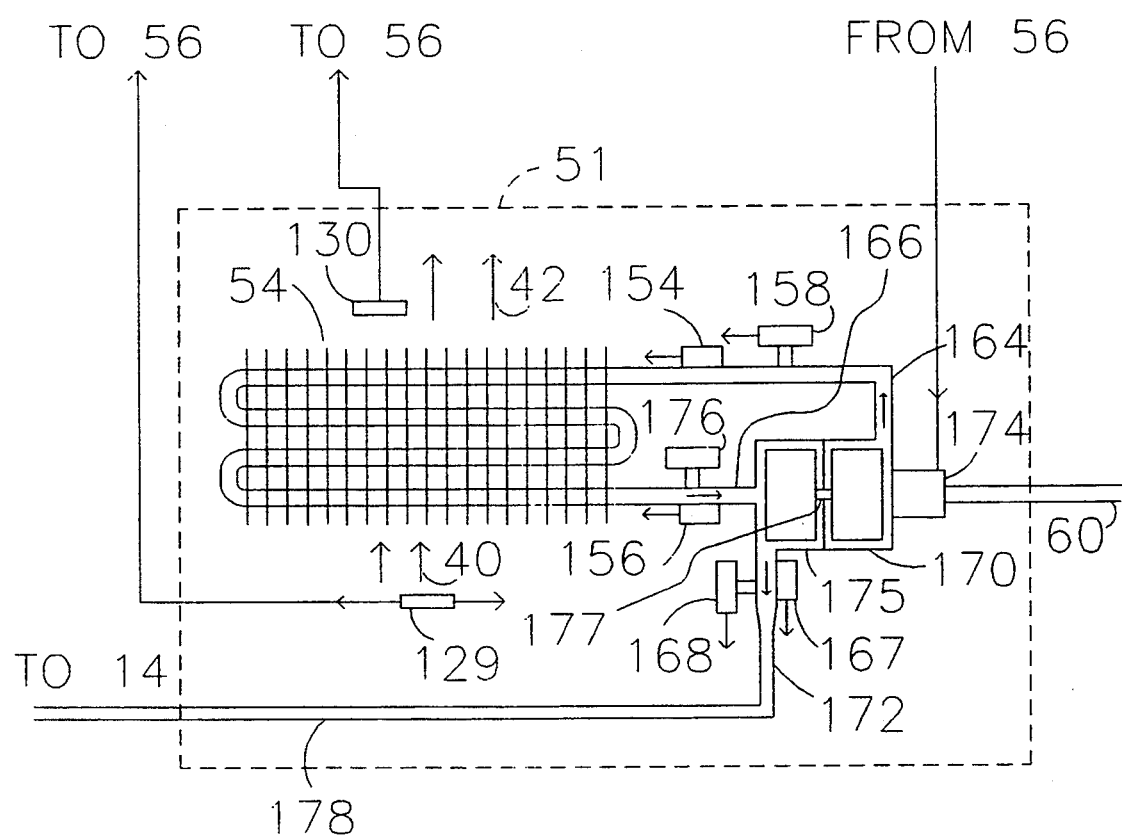
FIG. 2 shows an alternate embodiment of the evaporator system for use in the refrigeration system of FIG. 1.

FIG. 2 shows an alternate evaporator system 51 which may be used in place of the evaporator system 50 of the refrigeration system of FIG. 1. The operation of the evaporator system of FIG. 2 will now be described while referring to FIGS. 1 and 2. In the evaporator system of FIG. 2, an enthalpy engine 170 and a secondary compressor 175 are connected between the flow control device 174 and the evaporator coil 54. Specifically, the enthalpy engine 170 is connected between the flow control device 174 and the evaporator coil 54 inlet end 164, while the secondary compressor 175 is connected to the evaporator coil outlet end 166. The enthalpy engine 170 is mechanically coupled to the compressor 175, typically by a shaft 177, for driving or operating the compressor 175. In addition to the sensors provided in the evaporator system 50 of FIG. 1, a temperature sensor 167 and a pressure sensor 168 are installed in the line 172 at the output of the secondary compressor 175 for respectively providing signals to the control circuit 56 which are representative of the temperature and pressure of the refrigerant leaving the secondary compressor 175.

Still referring to FIGS. 1 and 2, the liquid refrigerant from the flow control device 174 passes through the enthalpy engine 170 wherein it expands. This expansion process within the expansion engine 170 removes some energy from the liquid refrigerant, which energy will not have to be removed by the evaporator, thereby improving the overall efficiency of the refrigeration system. The expansion of the liquid refrigerant drives (operates) the enthalpy engine 170, rotating the shaft 177, which in turn drives the compressor 175. The compressor 175 compresses the refrigerant leaving the coil 54 and discharges it into the suction line 10 via a gas line 178. The compressor 175 forms the first compression stage in the refrigeration system, which permits the use of a lower compression ratio primary compressor 14. Also, the compressor 175 utilizes the energy produced by the expansion engine, which would otherwise have been wasted.

Evaporators are typically located a substantial distance away from the primary compressor 14, thus, requiring a long suction line 10. In such applications, it is common to insulate the suction line 10. The use of the secondary compressor 175 to provide the first compression stage allows the use of a smaller diameter suction line 10. Additionally, the first compression stage raises the refrigerant temperature at point 172, allowing the use of a non-insulated suction line 10. The use of noninsulated smaller diameter line can result in savings, especially in refrigeration systems where the evaporator is placed a great distance from the primary compressor 14.

Improved efficiency in the refrigeration systems described above and other closed loop vapor cycle refrigeration systems is obtained by optimally controlling the refrigerant flow into the evaporator coil by controlling a parameter, herein referred to as the "control parameter," Ps. The control logic used to adjust the refrigerant flow is described in greater detail below while referring to FIGS. 1-3.

Figure 3:
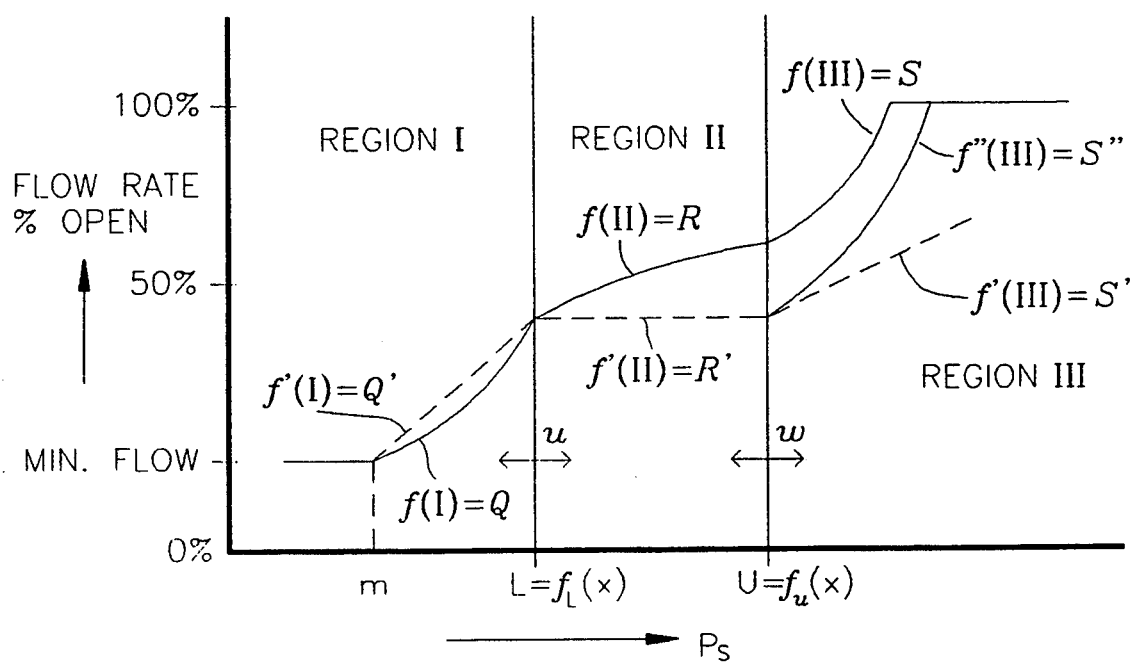
FIG. 3 is a graphical representation of a control response curve for use in the refrigeration system operated according to the present invention.

FIG. 3 is a graphical representation of a general control logic for controlling the refrigerant flow rate through the flow control device 174 of the present invention. The control parameter Ps to be used for controlling the flow through the flow control device is defined or selected. The superheat, Sh, temperature of the refrigerant leaving the evaporator, To, temperature of the crank case of the system compressor, Tc, a parameter defined as a function of certain system parameters, or any other suitable parameter may be selected as the control parameter Ps. In FIG. 3, the control parameter Ps is shown along the horizontal axis or x-axis and the flow rate of the refrigerant through the flow control device 174, as a percent of the maximum flow rate (100%) (fully open flow control device), is shown along the vertical axis or the y-axis. FIG. 3 shows three regions for the control parameter Ps: region II is a dynamic control region or range having an upper limit U and a lower limit L; region I represents the values of the control parameter below the control region and; region III represents values of the control parameter above the control region. The upper limit U and the lower limit L may be defined or specified as functions of one or more of the system parameters, such as the temperature of the air returning to the evaporator, Tr, (the "return air temperature"), the temperature of the air leaving the evaporator, Td, (the "discharge air temperature"), the coil temperature, Ti, the crank case temperature, Tc, the time of the day, T, and the like. Thus, U and L may be represented as $$U = f_U(x) = f_U(T, Tr, Td, Ti, To, Tc \ldots) \text{ and}$$

$$L = f_L(x) = f_L(T, Tr, Td, To, Ti, Tc \ldots),$$

where x represents the selected parameters. Such functional relationships cause the upper limit and/or the lower limit to change as the selected system parameters change, thereby making the control region II dynamic. Arrows u and w indicate that the upper limit and the lower limit may change as the values of the selected system parameters change.

FIG. 3 shows examples of several general flow control response curves which may be used to control the flow of the refrigerant through the evaporator. The use of such control curves will now be described. The control response curve Q-R-S defines a flow rate as the value of the control parameter Ps changes. When Ps is in region I, the flow rate through the flow control device is changed according to the nonlinear control response curve Q or f(I). If the value of Ps falls below a predetermined minimum value m, the flow rate is maintained at a minimum value and is not decreased any further. When Ps is in the dynamic control region II, the flow is controlled according to the control response R or f(II). Similarly, when the value of the parameter Ps exceeds the upper limit U, the refrigerant flow rate is controlled according to the nonlinear flow control response curve S or f(III). The control response curves may be defined or expressed as functions (f,g,h, etc) of the control parameter and the system parameters as:

$$Q = f(I) = f(Ps, T, Tr, Td, Ti, To \ldots)$$

$$R = f(II) = g(Ps, T, Tr, Td, Ti, To \ldots)$$

$$S = f(III) = h(Ps, T, Tr, Td, Ti, To \ldots)$$

$$S'' = f''(III) = j(Ps, T, Tr, Td, Ti, To \ldots)$$

The use of nonlinear control response curves, such as curves Q and S, causes the refrigeration system to respond more quickly to the changes in the operating conditions or the load on the refrigerant system compared to linear response curves, such as curves Q' and S'. In some applications it may be more desirable to maintain a constant flow rate as long as the control parameter Ps remains within the control region II. In such applications a control response curve such as the response curve Q-R'-S" may be used. Here, the flow rate is maintained at the rate defined by R' when the control parameter Ps is within the control region II and changed according to the nonlinear control response curve Q and S" respectively when the control parameter is in regions I and III.

As an example, each of the nonlinear response curves, Q, S or S' may be defined as an exponential function, wherein the exponent is a function of the control parameter Ps. For example, S may be defined as given below:

$$S = f(III) = h(Ps, T, Tr, Td, Ti, To \ldots) = a \cdot e^{b \cdot Ps}$$

where a and b are defined parameters and T, Tr, Td, Ti, To are set at zero. The control response curves Q and S" may similarly be defined.

The use of the general control logic of FIG. 3 will now be described by way of specific examples. As noted earlier, superheat Sh may be used as the control parameter, i.e., Ps=Sh. In such a case, the control response curve S may be expressed as:

$$S = a \cdot e^{b \cdot Sh}$$

Response curve Q may similarly be defined as a nonlinear function of the superheat. The term "superheat" is a term of art, which is generally defined as the temperature of the refrigerant vapor above the boiling temperature of the refrigerant, both measured at the same pressure. However, as a practical matter in the refrigeration art, the term superheat is frequently used to mean a convenient approximation of the true superheat and is computed differently for different refrigeration systems depending upon the design and operating conditions of the refrigeration system. For a closed loop vapor cycle refrigeration system, the superheat, Sh, is generally defined as the difference in the temperature of the gas refrigerant leaving the evaporator coil, To, and the temperature of the refrigerant entering the evaporator coil, Ti, which may be expressed as Sh=To−Ti. This temperature difference is taken as an acceptable approximation of the true superheat for the refrigeration system, particularly for evaporator coils having a low pressure drop from the inlet end to the outlet end. For convenience, and not as a limitation, the above described definition of the superheat, Sh, is used herein.

When the control response curve Q-R-S is used, the flow rate is controlled according to the nonlinear response curve Q when the superheat Sh is below the control region (region I), according to the curve R when the superheat is within the control region (region II), and according to curve S when the superheat is above the control region (region III). The use of an exponential relationship allows the control circuit to continually effect an increasing rate of change in the flow through the evaporator as the superheat (Sh) continues to increase beyond the upper limit U, as shown by the curve S in region III. Conversely, it allows for a decreasing rate of change of the flow rate as the superheat continues to fall below the lower limit, as shown by the curve Q in the region I. Appropriately defined nonlinear relationships allow the control circuit to maintain the same percent of change in the flow rate as the change in the superheat.

The dotted control response curve Q'-R'-S' indicates linear flow rate change in region I and region III and a constant flow rate in the control region II. Such a control response curve provides for a proportional control, which has been commonly used in the prior art for controlling the flow of the refrigerant through expansion valves. However, control response curves, such as curves Q-R-S and Q-R'-S" allow the control circuit to vary the rate of change of flow of the refrigerant through the flow control device nonlinearly as the demand or load varies, which makes the refrigeration system more responsive to the changes in the operating conditions, thereby improving the overall efficiency of the refrigeration system.

It will be obvious that other functional relationships may be used in FIG. 3 to define the control response curves for controlling the flow of the refrigerant through the evaporator.

Still referring to FIGS. 1-3, the dynamic region or the control region I may be defined as a function of certain system parameters. The more commonly used system parameters are: (1) Ti, the temperature of the refrigerant entering the evaporator coil (the coil or boiling temperature), from the information provided by the temperature sensor 154; (2) To, the temperature of the refrigerant leaving the evaporator outlet end 166 (FIG. 1), from the information provided by the temperature sensor 156, (3) Tr, the temperature of the air 40 returning to the evaporator coil 54, from the information provided by the temperature sensor 129 (the return air temperature); (4) Td, the temperature of the air 42 leaving the evaporator coil 54, from the information provided by the temperature sensor 130 (the discharge air temperature); (5) Tc, the crankcase temperature, from the information provide by the temperature sensor 132, (6) Toil, the compressor oil temperature, from the information provided by the temperature sensor 131, (7) the refrigerant pressures respectively at the evaporator coil inlet end and at the outlet end, from the information provided by the pressure sensors 158 and 160; and (8) other desired system parameters. The control circuit 56 also continually monitors the operation of the system elements, such as the compressor 14, flow control device 174 and fan 32.

The control circuit 56 may be programmed to contain any number of control criteria, each of which alone or in combination with others may be used to define the control region. When superheat is used as the control parameter Ps, the control circuit 56 is programmed to determine the superheat, Sh, and establish a desired superheat control region bounded by the upper limit U and the lower limit L. For certain refrigeration systems, it may be desirable to set these limits as a function of the return air temperature, Tr, and the coil temperature, Ti. One way to express such a functional relationship is:

$$U = K(Tr - Ti) \text{ and}$$

$$L = M(Tr - Ti)$$

where K and M are parameters, and K>M.

As an example, if $K=0.6$ and $M=0.4$ are specified to determine the control region, then the middle of the superheat control region is at one-half of the difference between the return air temperature and the coil temperature. It should be noted that as the difference between the return air temperature, Tr, and the coil temperature, Ti, changes, the control circuit 56 automatically adjusts the upper and lower limits, and thus the superheat control region.

In certain other applications, it may be more desirable to use the temperature difference between the discharge air temperature, Td, and the coil temperature, Ti, to define the superheat control region. One way to define such a control region is:

$$U = A(Td - Ti) \text{ and}$$

$$L = B(Td - Ti)$$

where A and B are parameters, and $A > B$.

As an example, $A=0.6$ and $B=0.4$ may be specified to determine the superheat control region, which means that the middle of the superheat control region is at one-half of the difference between the discharge air temperature and the coil temperature. It should be noted that as the difference between the discharge air temperature, Td, and the coil temperature, Ti, changes, the control circuit 56 automatically adjusts the upper and lower limits, and thus the superheat control region.

Still referring to FIGS. 1-3, the control circuit 56 computes the appropriate upper and lower limits of the dynamic range, determines the superheat Sh and causes the refrigerant flow rate to increase when the superheat Sh is above the upper limit according to its corresponding control response curve and causes the flow rate to decrease when the superheat falls below the lower limit, thereby continually attempting to maintain the superheat within the control region. In this manner, the refrigeration system attempts to maintain the superheat, Sh, within a dynamic control region that is functionally related to selected system parameters. Other functional relationships, whether linear or nonlinear may also be used to define the superheat control region.

As described earlier, the temperature, To, of the gas refrigerant leaving the evaporator is functionally related to the superheat, Sh, as:

$$Sh = To - Ti \text{ or } To = Ti + Sh$$

Therefore, the superheat, Sh, may be maintained within the desired control region by maintaining the temperature of the refrigerant leaving the evaporator coil, To, within an appropriately defined control region. In such a case the upper limit, U, and the lower limit L of the control region may be specified as functions of Tr and Ti as:

$$U = Ti + K(Tr - Ti) \text{ and}$$

$$L = Ti + M(Tr - Ti)$$

where K and M are parameters, and $K > M$.

Similarly, the control region for the temperature of the refrigerant leaving the evaporator, To, may be specified as a function of the discharge air temperature, Td, and the coil temperature, Ti as:

$$U = Ti + A(Td - Ti) \text{ and}$$

$$L = Ti + B(Td - Ti)$$

where A and B again are parameters, and $A > B$.

In the above examples, the refrigerant flow through the flow control device 174 is increased when the temperature of the refrigerant leaving the evaporator, To, is above the upper limit, U, and the flow is decreased when To falls below the lower limit, L. The values of the parameters A and B chosen depend upon the refrigeration system design and the operating conditions for which it is used.

Similarly, other desired functions of the system parameters may be used to define the control region. For example, the superheat control region may be defined as a function of the return air temperature, Tr, alone or the discharge air temperature, Td, alone. In certain other applications, it may be desirable to establish a superheat control region that is a function of the difference between the compressor crankcase temperature or the compressor oil temperature and the coil temperature, i.e., $Tc - Ti$ or $Toil - Ti$.

The above described methods provide means for self adjusting the superheat control region as a function of selected system parameters and for maintaining the superheat, Sh, within such a control region by appropriately adjusting the refrigerant flow through the evaporator. It should be noted that in the control strategies described above, the superheat control region is functionally related to at least one dynamic system parameter and the control region is automatically adjusted as the values of the selected parameters change.

Yet in other applications, it may be more desirable to use a parameter other than the superheat as the control parameter Ps, such as the crank case temperature or the compressor oil temperature, some other system parameter, or a function of certain system parameters. In each such case, a desired dynamic control region for the control parameter is defined. The refrigerant flow through the evaporator coil is increased according to a control response curve when the control parameter is above the control region and the flow is decreased when such parameter falls below the control region. For example, when the crank case temperature is used as the control parameter, the refrigerant flow through the evaporator coil is increased when the crank case temperature is above its control region and the flow is decreased when the crank case temperate falls below the control region. Also, it may be desirable to cut-off the compressor if the compressor crankcase temperature exceeds a predetermined maximum value. Similarly, compressor oil temperature may be used as the control parameter.

It should be obvious that the control parameter Ps, the control region and other functional relationships described above may be expressed in any number of other desired ways. It should also be obvious that the refrigerant flow through the evaporator may be controlled as a function of any number of system parameters other than the ones noted above and that the functional relationship selected may be changed as desired.

It is possible to use a number of operating or design criteria when a micro-controller based circuit, such as the control circuit 56, is used. The control circuit 56 may be programmed to store a number of design criteria and the operating conditions under which to use those criteria for automatically adjusting the control region. One method is to store precalculated values of the selected functions in the form that is commonly known as the look-up tables. The control circuit 56 determines the various temperatures and pressures, consults the look-up tables in its memory and controls the refrigerant flow through the flow control device 174.

In each of the control logic described above, the control circuit 56 may be programmed to keep track of the historical values of the control region, the frequency of increasing and decreasing the flow rate, the flow rate as a function of time, and other useful statistics. The control circuit further may be programmed to adjust the control region, for example by adjusting the values of the parameters A and B or K and M in response to these statistics and in accordance with the instructions provided to or programmed in the control circuit 56. Also, the increase or decrease in the liquid refrigerant flow through the flow control device 174 may be activated after a desired amount of time has lapsed after the condition requiring an increase or decrease in the flow has occurred.

The control circuit 56 may also be used to compute and provide information relating to certain design criteria and information relating to the overall performance of the refrigeration system. For example, the microcontroller may provide to an operator the discharge air temperature. Refrigeration fixture manufacturers typically specify the design TD, temperature difference between return air and coil temperatures, for which the fixture is designed. Therefore, the reporting of the TD will aid the operator to monitor the performance of the fixture and to take necessary corrective actions to ensure that the refrigeration system is operating according to the fixture specifications. Thus, micro-controller 56 may be used to report the actual TD to the operator.

Similarly, other appropriately defined flow rate response curves may be used when the flow of the refrigerant is controlled by controlling other system parameters, such as the temperature of the gas leaving the evaporator, To, or the crank case temperature, Tc, and the like.

In the refrigeration system of the present invention, it is preferred that a pulse modulated solenoid valve is used as the flow control device. However, such valves impart liquid shock to the refrigerant each time they are turned on or turned off. To eliminate the liquid shock, the control circuit 56 is programmed to slowly open and close the solenoid valve to avoid liquid shocks in the refrigerant. The apparatus and method for turning on and off pulse modulated solenoid valves and the nonlinear control response curve for controlling the flow of the refrigerant through a flow control device are described in the parent patent application Ser. No. 08/001,107, which is incorporated herein by reference for all purposes.

A significant advantage of the above described refrigeration systems is that a large majority of the existing refrigeration systems can easily be modified to incorporate the present invention.

The foregoing descriptions are directed to particular embodiments of the invention for the purpose of illustration and explanation. It will be apparent, however, to one skilled in the art that many modifications and changes to the embodiments set forth above are possible without departing from the scope and the spirit of the invention. It is intended that the following claims be interpreted to embrace all such changes and modifications.

What is claimed is:

1. A method of operating a refrigeration system having an evaporator for evaporating a liquid refrigerant into a gas refrigerant, said method comprising the steps of:
   (a) selecting a control parameter;
   (b) establishing a dynamic control region for the control parameter as a function of a system parameter of the refrigeration system;
   (c) determining the value of the control parameter; and
   (d) increasing the flow of the liquid refrigerant into the evaporator when the value of the control parameter is above the dynamic control region and decreasing the flow when the value of the control parameter is below the dynamic control region.

2. A method of operating a refrigeration system having an evaporator for evaporating a liquid refrigerant into a gas refrigerant, said method comprising the steps of:
   (a) defining a control parameter
   (b) establishing for the control parameter a control region that is functionally related to a system parameter;
   (c) defining a flow control response function for the flow rate of the liquid refrigerant into the evaporator for the values of the control parameter above the control region and a response function for the values of the control parameter below the control region;
   (d) determining the value of the control parameter; and
   (e) adjusting the flow of the liquid refrigerant into the evaporator when the value of the control parameter is outside the control region according to the flow control response function which corresponds to the value of the control parameter.

3. The method of claim 2, wherein the control parameter is the superheat of the refrigerant leaving the evaporator.

4. The method of claim 2, wherein the evaporator has a return air associated therewith and wherein the control parameter is the superheat of the refrigerant leaving the evaporator and the system parameter is the temperature of the return air.

5. The method of claim 2, wherein the evaporator has a return air associated therewith and wherein the control parameter is the superheat of the refrigerant leaving the evaporator and the system parameter is a function of the temperature difference between the return air temperature and the boiling temperature of the refrigerant in the evaporator.

6. The method of claim 2, wherein the evaporator has a return air associated therewith and wherein the control parameter is the superheat of the refrigerant leaving the evaporator and the control region has an upper limit, U, defined as $U = K(T_r - T_i)$ and a lower limit, L, defined as $L = M(T_r - T_i)$, where $T_r$ is the return air temperature, $T_i$ is the boiling temperature of the refrigerant in the evaporator, K and M are predetermined parameters and K is greater than M.

7. The method of claim 6, wherein $K = 0.7$ and $M = 0.4$.

8. The method of claim 2, wherein the evaporator has a discharge air associated therewith and wherein the control parameter is the superheat of the refrigerant leaving the evaporator and the control region has an upper limit, U, defined as $U = A(T_d - T_i)$ and a lower limit, L, defied as $L = B(T_d - T_i)$, where $T_d$ is the discharge air temperature, Ti is the boiling temperature of the refrigerant in the evaporator, A and B are predetermined parameters and A is greater than B.

9. The method of claim 8, wherein A=0.6 and B=0.4.

10. The method of claim 2, wherein the flow control response function for the values of the control parameter above the control region is a nonlinear function.

11. The method of claim 2, wherein the flow control response function for the values of the control parameter below the control region is a nonlinear function.

12. The method of claim 2, wherein the flow control response functions are nonlinear functions.

13. A method of operating a refrigeration system having an evaporator for evaporating a liquid refrigerant into a gas refrigerant, said method comprising the steps of:
  (a) establishing a control parameter;
  (b) establishing a plurality of dynamic control regions for the control parameter as a function of a system parameter;
  (b) defining a flow control response function for the flow rate of the liquid refrigerant into the evaporator corresponding to each of the control regions in said plurality of control regions;
  (c) determining the value of the control parameter; and
  (d) adjusting the flow rate of the liquid refrigerant entering the evaporator to the level defined by the control response function which corresponds to the value of the control parameter.

* * * * *